(12) United States Patent
Kim

(10) Patent No.: US 8,919,818 B2
(45) Date of Patent: Dec. 30, 2014

(54) WHEEL GUARD FOR VEHICLE

(71) Applicant: Hyundai Motor Company, Seoul (KR)

(72) Inventor: Hyun Gyung Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 51 days.

(21) Appl. No.: 13/796,438

(22) Filed: Mar. 12, 2013

(65) Prior Publication Data

US 2014/0183850 A1   Jul. 3, 2014

(30) Foreign Application Priority Data

Dec. 28, 2012 (KR) .................. 10-2012-0156295

(51) Int. Cl.
 *B62D 25/18* (2006.01)
 *B60R 13/08* (2006.01)
 *B62D 25/16* (2006.01)

(52) U.S. Cl.
 CPC ............ *B60R 13/0861* (2013.01); *B62D 25/16* (2013.01)
 USPC .......................................... 280/847; 280/851

(58) Field of Classification Search
 CPC ...... B62D 25/16; B62D 25/161; B62D 25/18; B60R 13/0861; G10K 11/172
 USPC .............. 280/847, 848, 152.3, 155–157, 280/159–160.1
 See application file for complete search history.

(56) References Cited

U.S. PATENT DOCUMENTS

| | | | | |
|---|---|---|---|---|
| 3,166,149 A | * | 1/1965 | Hulse | 181/292 |
| 3,211,253 A | * | 10/1965 | Gonzalez | 181/292 |
| 3,279,818 A | * | 10/1966 | Jones | 280/851 |
| 3,693,750 A | * | 9/1972 | Takkunen | 428/558 |
| 3,770,560 A | * | 11/1973 | Elder et al. | 428/138 |
| 3,821,999 A | * | 7/1974 | Guess et al. | 181/296 |
| 4,013,302 A | * | 3/1977 | Oswald | 280/851 |
| 4,205,861 A | * | 6/1980 | Roberts et al. | 280/851 |
| 4,663,381 A | * | 5/1987 | Blumel et al. | 524/426 |
| 4,796,906 A | * | 1/1989 | Sullivan | 280/851 |
| 5,000,483 A | * | 3/1991 | Blumel et al. | 280/847 |
| 5,022,680 A | * | 6/1991 | Eklund, Jr. | 280/851 |
| 5,207,455 A | * | 5/1993 | Gotz et al. | 280/848 |
| 5,273,318 A | * | 12/1993 | Nakayama et al. | 280/851 |
| 5,280,960 A | * | 1/1994 | Casey | 280/848 |
| 5,326,135 A | * | 7/1994 | Nakayama et al. | 280/850 |
| 5,366,247 A | * | 11/1994 | Fischer | 280/851 |

(Continued)

FOREIGN PATENT DOCUMENTS

| | | |
|---|---|---|
| JP | H07-315252 A | 12/1995 |
| JP | 2000-233693 A | 8/2000 |
| KR | 10-1998-073253 | 11/1998 |
| KR | 10-2011-0029369 | 3/2011 |

*Primary Examiner* — Hau Phan
*Assistant Examiner* — Jacob Meyer
(74) *Attorney, Agent, or Firm* — Edwards Wildman Palmer LLP; Peter F. Corless

(57) ABSTRACT

Disclosed herein is a wheel guard for a vehicle which may sufficiently absorb and reduce high frequency noise of various frequency bands produced from a tire, using resonance apertures 11a, resonance necks 11b, and resonance chambers 20. The wheel guard includes a resonance wheel guard that is fixed to a vehicle body panel and includes a plurality of resonance apertures. Additionally, the wheel guard includes a resonance chamber cover that is attached to a rear of the resonance wheel guard and forms a plurality of resonance chambers between the resonance wheel guard and the resonance chamber cover.

6 Claims, 6 Drawing Sheets

(56) References Cited

U.S. PATENT DOCUMENTS

| | | | |
|---|---|---|---|
| 5,462,331 A * | 10/1995 | Stief et al. | 296/198 |
| 5,598,479 A * | 1/1997 | Dodt et al. | 381/71.7 |
| 5,633,067 A * | 5/1997 | Illbruck et al. | 428/138 |
| 5,681,072 A * | 10/1997 | Stricker | 296/39.3 |
| 5,839,761 A * | 11/1998 | Dodt | 280/851 |
| 5,962,823 A * | 10/1999 | Asahara et al. | 181/286 |
| 6,012,543 A * | 1/2000 | Shimpo et al. | 181/286 |
| 6,152,469 A * | 11/2000 | Gadowski | 280/154 |
| 6,729,652 B2 * | 5/2004 | Cicansky | 280/847 |
| 6,799,782 B2 * | 10/2004 | Jain et al. | 280/848 |
| 6,880,883 B2 * | 4/2005 | Decker et al. | 296/203.02 |
| 6,944,949 B2 * | 9/2005 | Banry et al. | 29/897.2 |
| 6,953,205 B2 * | 10/2005 | Friest et al. | 280/770 |
| 7,097,208 B2 * | 8/2006 | Maurer et al. | 280/851 |
| 7,419,188 B2 * | 9/2008 | Nicolai et al. | 280/847 |
| 7,448,468 B2 * | 11/2008 | Czerny et al. | 181/210 |
| 7,497,509 B2 * | 3/2009 | Omiya et al. | 296/198 |
| 7,625,013 B2 * | 12/2009 | Kellick | 280/851 |
| 7,654,364 B2 * | 2/2010 | Yamaguchi et al. | 181/293 |
| 7,677,358 B2 * | 3/2010 | Tocchi et al. | 181/290 |
| 8,167,335 B2 * | 5/2012 | Takeuchi | 280/851 |
| RE44,755 E * | 2/2014 | Surti | 280/851 |
| 2002/0109347 A1 * | 8/2002 | Sheppard | 280/851 |
| 2003/0011183 A1 * | 1/2003 | Freist et al. | 280/770 |
| 2004/0135362 A1 * | 7/2004 | Banry et al. | 280/847 |
| 2004/0262906 A1 * | 12/2004 | Nicolai et al. | 280/847 |
| 2006/0144627 A1 * | 7/2006 | Czerny et al. | 180/69.25 |
| 2010/0078927 A1 * | 4/2010 | Takeuchi | 280/851 |
| 2011/0108359 A1 * | 5/2011 | Nishimura et al. | 181/290 |
| 2013/0062871 A1 * | 3/2013 | Uehark et al. | 280/850 |
| 2013/0118831 A1 * | 5/2013 | Kawai et al. | 181/290 |
| 2013/0341899 A1 * | 12/2013 | Boyd | 280/850 |

* cited by examiner

WHEEL GUARD FOR VEHICLE

CROSS-REFERENCE TO RELATED APPLICATION

This application claims under 35 U.S.C. §119(a) the benefit of Korean Patent Application No. 10-2012-0156295 filed Dec. 28, 2012, the entire contents of which are incorporated herein by reference.

BACKGROUND (a) Technical Field

The present invention relates to a wheel guard for a vehicle, and more particularly, to a wheel guard for a vehicle that reduces noise by absorbing road noise and sand noise of various frequency bands which are produced from a tire.

(b) Background Art

Generally, since vehicles are moved by the rotation of wheels turning on a road, dirt such as muddy water and gravel sticks to the wheels and the dirt is separated and removed from the wheel by centrifugal force of the wheels. The dirt removed from the wheels causes damage to the vehicle body such as corrosion, and particularly, causes damage to other surrounding vehicles or injury to a pedestrian. Thus, to prevent the potential damage, as shown in FIGS. 1 to 2, a wheel guard 3 configured to prevent scattering of dirt is mounted to a vehicle body panel 2 around a wheel 1.

The wheel guard 3 of the related art is a plastic panel and prevents scattering of dirt, but may not sufficiently reduce a substantial amount of road noise and sand noise, Thus, a sound absorbing member 4 made of fabric is attached to the rear of the wheel guard 3.

However, the attachment of the sound absorbing member 4 may not sufficiently absorb road noise and sand noise, and particularly, the member may not effectively absorb noise of various frequency bands generated from tires.

The description provided above as a related art of the present invention is merely for helping understanding the background of the present invention and should not be construed as being included in the related art known by those skilled in the art.

SUMMARY

The present invention provides a wheel guard for a vehicle that may reduce noise by absorbing road noise and sand noise of various frequency bands which are produced from a tire while a vehicle is driven, and may improve marketability of the wheel guard for a vehicle.

According to one aspect of the present invention, a wheel guard for a vehicle, may include: a resonance wheel guard fixed to a vehicle body panel and having a plurality of resonance apertures; and a resonance chamber cover attached to a rear of the resonance wheel guard and forming a plurality of resonance chambers between the resonance wheel guard and the resonance chamber cover. Furthermore, a plurality of resonance necks may protrude from the resonance wheel guard and each resonance aperture may correspond to each resonance neck.

The resonance chamber cover may include integrally protruding separation ribs that separately form the resonance chambers in contact with the resonance wheel guard. Additionally, the size of the resonance aperture may gradually increase or decrease toward the center of the resonance wheel guard at the left and right ends of the resonance wheel guard in the width direction of a tire. When the size of the resonance aperture gradually increases toward the center of the resonance wheel guard, the length of the resonance neck and the volume of the resonance chamber may gradually decrease. When the size of the resonance aperture gradually decreases toward the center of the resonance wheel guard, the length of the resonance neck and the volume of the resonance chamber may gradually increase.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

Figure 1:
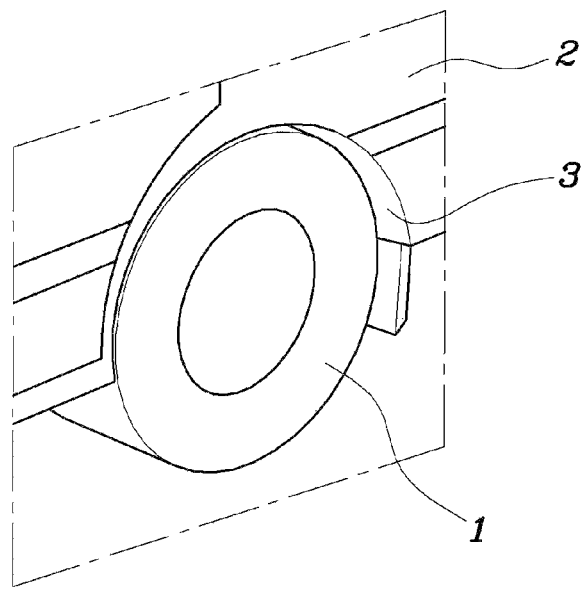
FIGS. 1 to 2 are exemplary views illustrating a wheel guard for a vehicle according to the related art.
Figure 2:
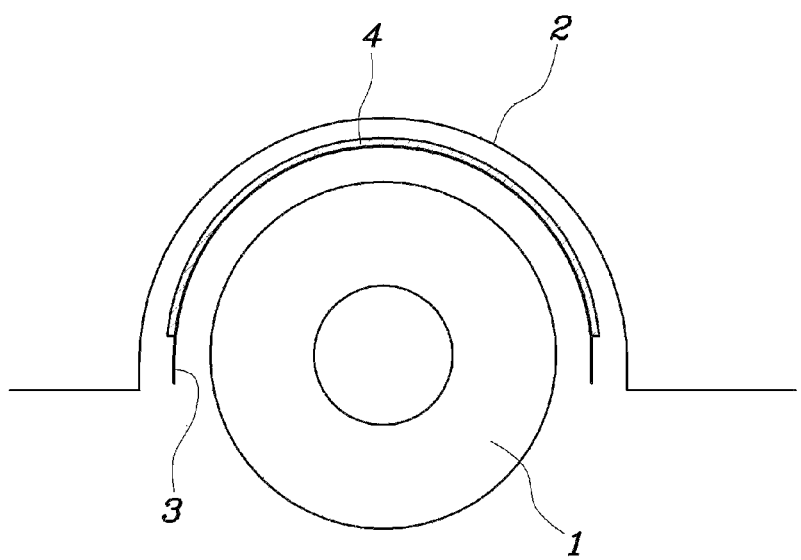

It should be understood that the accompanying drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

A wheel guard for a vehicle according to exemplary embodiments of the present invention is described hereafter in detail with reference to the accompanying drawings.

Figure 3:
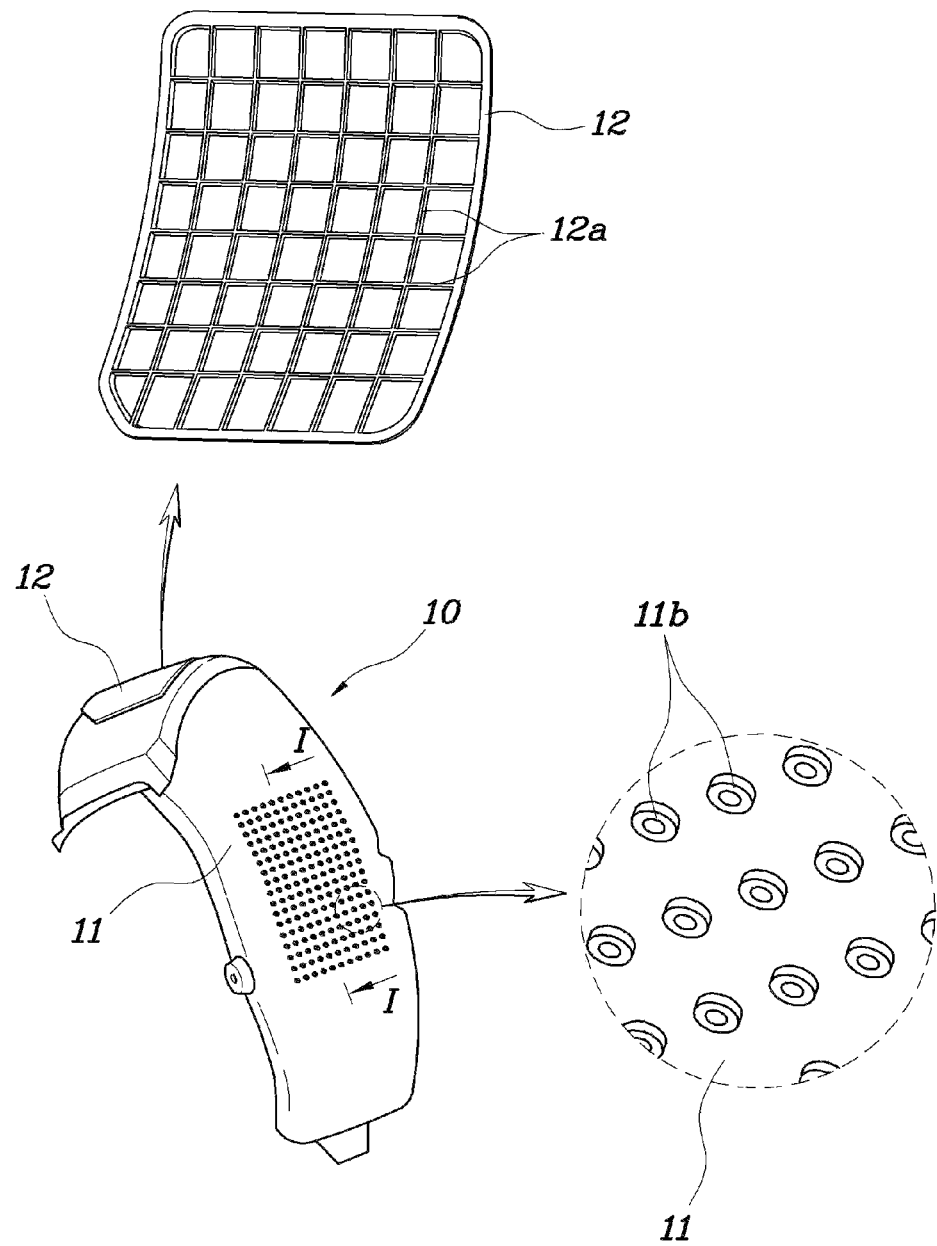
FIG. 3 is an exemplary view illustrating a wheel guard for a vehicle according to an exemplary embodiment of the present invention.
Figure 4:
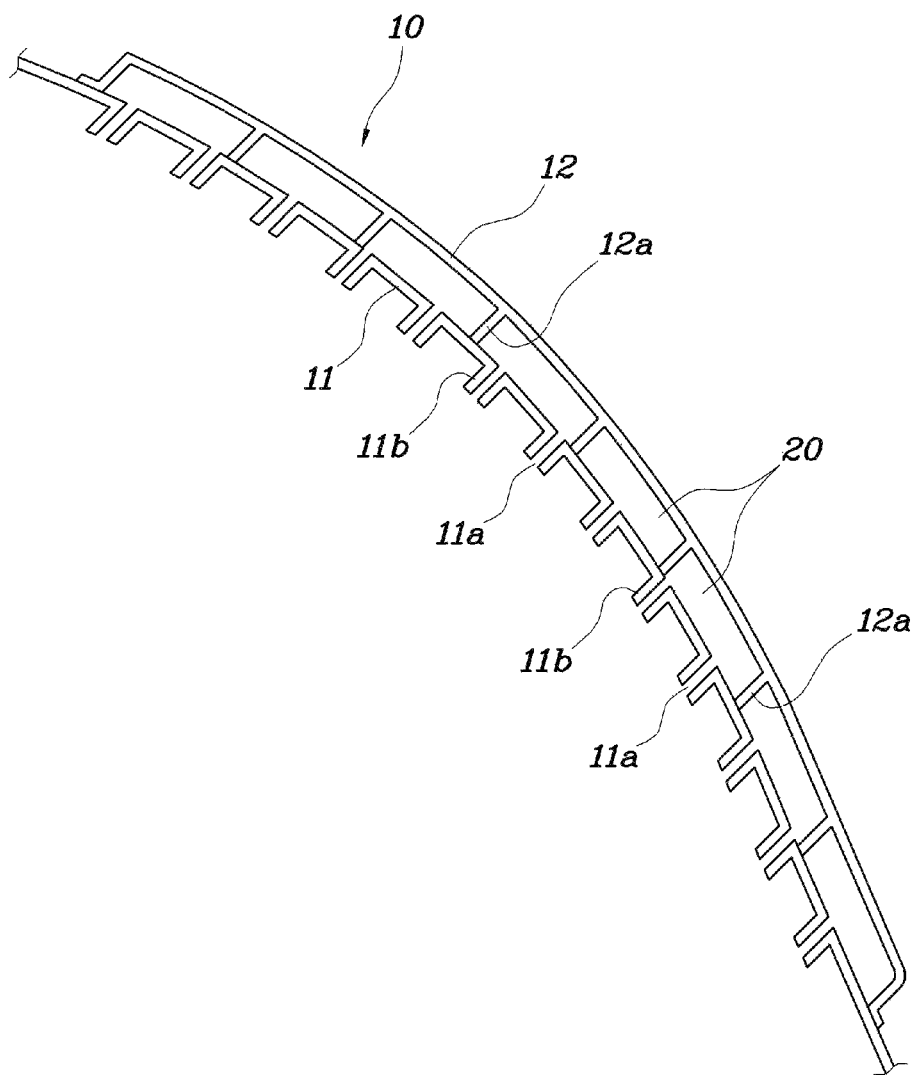
FIG. 4 is an exemplary cross-sectional view taken along the line I-I of FIG. 3 according to an exemplary embodiment of the present invention.

A wheel guard 10 for a vehicle according to the present invention, as shown FIGS. 3 to 4, may include a resonance wheel guard 11 fixed to a vehicle body panel 2 (see FIG. 1) may include a plurality of resonance apertures 11a; and a resonance chamber cover 12 attached to the rear of the resonance wheel guard 11 and may form a plurality of resonance chambers 20 between the resonance wheel guard 11 and the resonance chamber cover 12.

Further, a plurality of resonance necks 11b may protrude from the resonance wheel guard 11 wherein each resonance aperture 11a corresponds to each resonance neck 11b. Further, the resonance chamber cover 12 may include integrally protruding separation ribs 12a that may separately form the resonance chambers 20 in contact with the resonance wheel guard 11. The separation rib 12a may be formed in a rectangular shape, accordingly the resonance chamber 20 may have a volume defined by a hexahedron.

Figure 5:
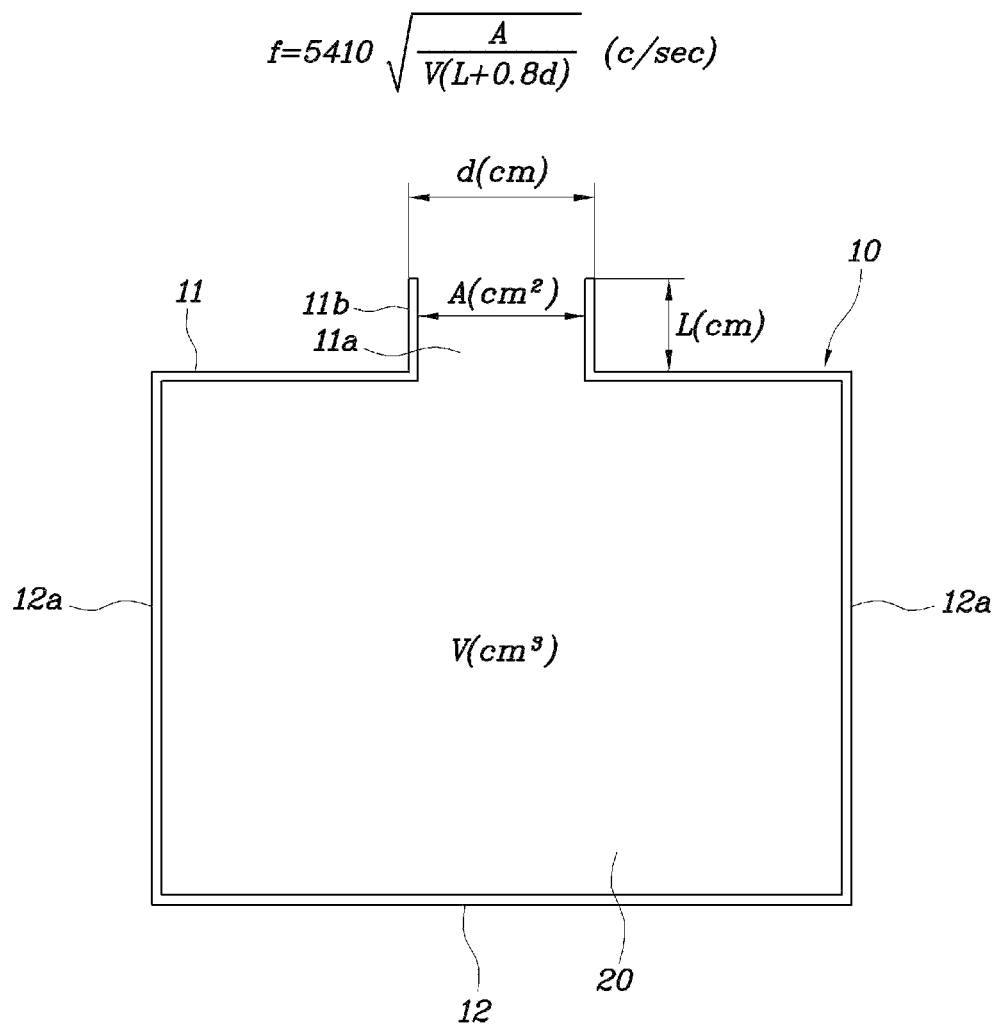
FIG. 5 is an exemplary view illustrating a resonance frequency of a Helmholtz resonator according to an exemplary embodiment of the present invention.

As described above, the wheel guard 20 equipped with the resonance apertures 11a, resonance necks 11b, and resonance chambers 20 may calculate a resonance frequency f, using the principle of a Helmholtz resonator, as shown in FIG. 5. In FIG. 5, A is the cross-sectional area of the resonance aperture 11a, d is the diameter of the resonance aperture 11a, l is the length of the resonance neck 11b, and V is the volume of the resonance chamber 20. Furthermore, using the principle of the Helmholtz resonator, the wheel guard 10 according to the present invention may effectively absorb and reduce noise of various frequency bands by adjusting the size of the resonance aperture 11a, the length of the resonance neck 11b, and the size of the resonance chamber 20.

Figure 6:
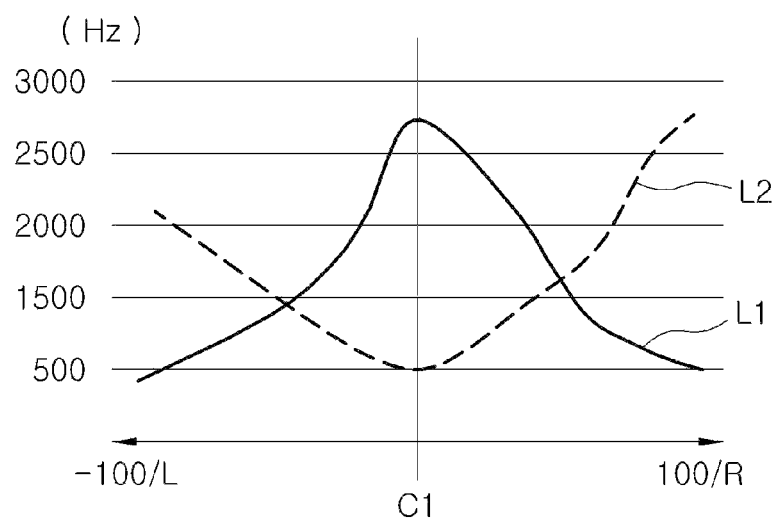
FIGS. 6 to 7 are exemplary graphs showing the relationship of resonance frequencies according to the patterns of resonance apertures, resonance necks, and resonance chambers in a wheel guard according to an exemplary embodiment of the present invention.
Figure 7:
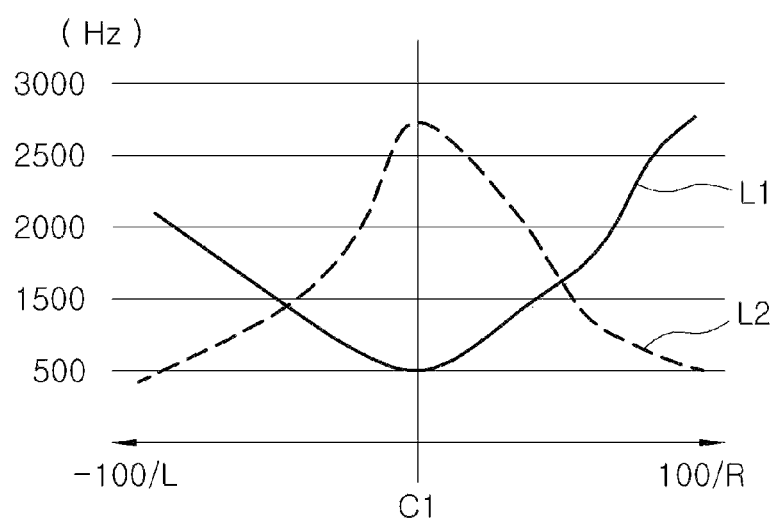

In other words, noise with substantially high frequency produced from a tire may be generated at the bands of 500 Hz~2500 Hz and the size of the resonance aperture 11a may be gradually increased or decreased toward the center C1 of the resonance wheel guard 11, indicated by a solid line L1 in FIG. 6 and a dotted line L1 in FIG. 7 according to exemplary embodiments of the present invention. The center C1 of the resonance wheel guard 11 is the middle point between the left and right ends of the resonance wheel guard 11 in the width direction of a tire.

As described above, when the size of the resonance aperture 11a is gradually increased toward the center C1 of the resonance wheel guard 11 (solid line L1) as shown in FIG. 6, the length l of the resonance neck 11b and the volume V of the resonance chamber 20 may gradually decrease (dotted line L2). In other words, noise of a frequency band that gradually increases toward the center C1 of the resonance wheel guard 11 may be absorbed and reduced by the resonance aperture 11a, whereas noise of a frequency band that gradually decreases toward the center C1 of the resonance wheel guard 11 may be absorbed and reduced by the resonance neck 11b and the resonance chamber 20.

In contrast, when the size of the resonance aperture 11a is gradually decreased toward the center C1 of the resonance wheel guard 11 (solid line L1), as shown in FIG. 7, the length l of the resonance neck 11b and the volume V of the resonance chamber 20 may gradually increase (dotted line L2). In other words, noise of a frequency band that gradually decreases toward the center C1 of the resonance wheel guard 11 may be absorbed and reduced by the resonance aperture 11a, whereas noise of a frequency band that gradually increases toward the center C1 of the resonance wheel guard 11 may be absorbed and reduced by the resonance neck 11b and the resonance chamber 20.

Figure 8:
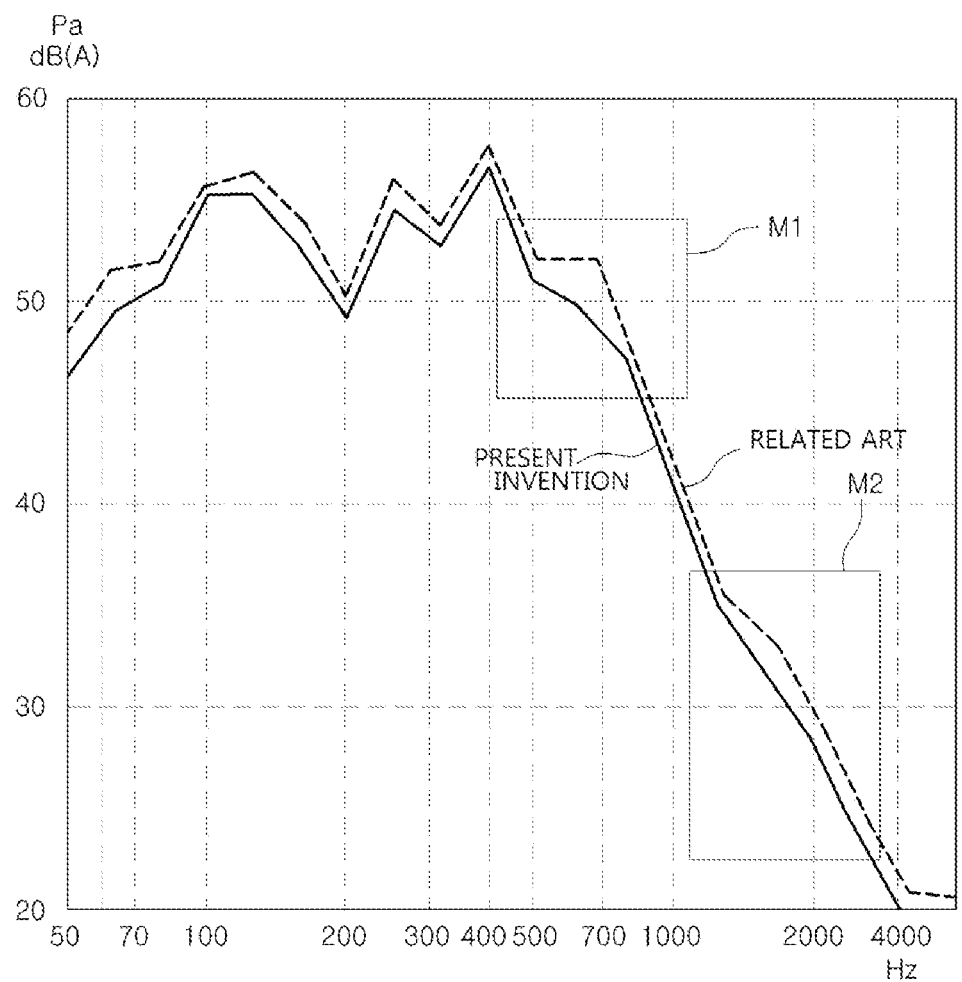
FIG. 8 is an exemplary graph comparing noise of a wheel guard according to an exemplary embodiment of the present invention with noise of a wheel guard of the related art.

FIG. 8 shows an exemplary graph comparing noise when a wheel guard 3 of the related art is mounted to noise when the wheel guard 10 according to the present invention is mounted. Since high frequency noise produced from a tire is usually generated at bands of 500 Hz~2500 Hz, examining the region M1 and the region M2 shows that the wheel guard 10 according to the present invention further absorbed and reduced noise by about 1 dB compared to the wheel guard 3 of the related art, thus, noise may be reduced by about 10%.

As described above, the wheel guard 10 according to the present invention may sufficiently absorb and reduce high frequency noise of various frequency bands, that is, road noise and sand noise, produced from a tire, using the resonance apertures 11a, the resonance necks 11b, and the resonance chambers 20, which may improve marketability of the feel guard for a vehicle.

The invention has been described in detail with reference to exemplary embodiments thereof. However, it will be appreciated by those skilled in the art that changes may be made in these embodiments without departing from the principles and spirit of the invention, the scope of which is defined in the accompanying claims and their equivalents.

What is claimed is:

1. A wheel guard for a vehicle, comprising:
   a resonance wheel guard fixed to a vehicle body panel includes a plurality of resonance apertures; and
   a resonance chamber cover attached to a rear of the resonance wheel guard forms a plurality of resonance chambers between the resonance wheel guard and the resonance chamber cover,
   wherein a plurality of resonance necks protrude from the resonance wheel guard, wherein each resonance aperture corresponds to each resonance neck.

2. The wheel guard of claim 1, wherein the resonance chamber cover includes integrally protruding separation ribs that separately form the resonance chambers in contact with the resonance wheel guard.

3. The wheel guard of claim 1, wherein the size of each resonance aperture gradually increases toward the center of the resonance wheel guard from left and right ends of the resonance wheel guard in the width direction of a tire.

4. The wheel guard of claim 3, wherein when the size of the resonance aperture gradually increases toward the center of the resonance wheel guard, the length of the resonance neck and a volume of the resonance chamber gradually decrease.

5. The wheel guard of claim 1, wherein the size of each resonance aperture gradually decreases toward the center of the resonance wheel guard from left and right ends of the resonance wheel guard in the width direction of a tire.

6. The wheel guard of claim 5, wherein when the size of the resonance aperture gradually decreases toward the center of the resonance wheel guard, the length of the resonance neck and a volume of the resonance chamber gradually increase.

* * * * *